Dec. 13, 1966  C. W. HIGHBERG ET AL  3,290,832
APPARATUS FOR GRINDING

Filed March 9, 1964  2 Sheets-Sheet 2

INVENTORS.
CARL W. HIGHBERG &
ROBERT E. BONNET
BY
Brumbaugh, Free, Graves & Donohue
their ATTORNEYS

United States Patent Office 3,290,832
Patented Dec. 13, 1966

3,290,832
APPARATUS FOR GRINDING
Carle W. Highberg and Robert E. Bonnet, Murray Hill, N.J., assignors to Engelhard Hanovia, Inc., Newark, N.J., a corporation of New Jersey
Filed Mar. 9, 1964, Ser. No. 350,335
4 Claims. (Cl. 51—165)

The present invention relates to apparatus for surfacing a planar work surface such as flat sheets of glass, stone, ceramics, and similar material, and, more particularly, to a novel and improved apparatus for providing a uniform grinding relation between the work surface and all portions of the grinding surface contiguous therewith and for controlling the load relation between the grinding head and the work surface.

A wide variety of apparatus and techniques have long been used in the surfacing of sheets of glass and like material utilizing power-operated rotary grinding heads adapted to overlie and be in grinding relation to the work surface. In the case of the surfacing of sheets of plate glass, one commonly employed technique includes a continuous surfacing line extending many hundreds of feet with the flat sheets of glass mounted on the top of moving flat cars in a bed of plaster of Paris. A plurality of grinding and polishing stations are spaced along the surfacing line to effectuate the grinding and polishing of the flat sheets of glass in a continuous and progressive manner. The grinding heads customarily are large flat metal discs adapted to overlie the sheet of glass and effect grinding through the use of a flow of loose abrasive such as a slurry of beach sand of varying particle size passing between the rotating grinding surface of the grinding head and the relatively moving sheet of glass, continuously moving along the grinding line through each of the various stations.

The rotary grinding head is normally driven by a power-operated concentric spindle which is relatively loosely coupled to the grinding head. The load or pressure of the grinding head upon the surface of the glass is a function of the mass of the grinding head and is normally varied by the selective addition or subtraction of large cast iron blocks to the top surface of the grinding head. This type of grinding head is commonly called a "floating head" because the load is controlled solely by the mass of the head, including the weights, and the loose coupling between the spindle and the head permitting relative axial movement of the head with respect to the spindle, which is essential in order to permit effective loading of the head.

With loose abrasive grinding wherein the thickness of the slurry flow across the face of the grinding head and the contiguous glass sheets varies and is not subject to fine control, the dynamic balancing of the head is not particularly important, although the spindle may be driven at high speeds and the mass of the head may be in thousands of pounds.

The grinding head is normally placed on or lifted completely from the surface of the sheet of glass by means of a conventional lever and hand screw arrangement, which is in no way intended to control the load conditions of the grinding head relative to the glass surface and in fact could not do so because of the necessary loose coupling between the spindle and grinding head, e.g. the necessary space between the shaft driving pins and the grinding wheel.

In contrast to the above described loose abrasive beach sand grinding technique, it has recently been found that large sheets of glass may be surfaced on a highly competitive production basis to a point of substantial optical quality by the use of diamond particles fixedly bonded in extremely low concentrations in preformed grinding segments mounted on large circular rotary grinding heads in the order of five or more feet in diameter. At first such diamond grinding stations utilized the same spindle driving mechanisms and head construction as employed with loose abrasives, the load of the head upon the sheet of glass being controlled by the addition or subtraction of large blocks of cast iron. In order to accomplish requisite glass removal and surfacing, it was found necessary to in some way improve and control the dynamic balance and contour-following capability of the grinding heads to effectuate a uniform grinding relation between the surface of the glass and all portions of the grinding head surface contiguous therewith, and to progressively vary the load of the grinding head on the sheet of glass during the working life of the grinding head in order to effectuate a constant predetermined glass removal and maintenance of other essential criteria such as predetermined depth of fracture in the surface of the glass, normally incident to a grinding operation. In a particular application with five foot diameter grinding wheels and four foot wide glass sheets the desired pressure exerted by a grinding head was found to vary through a range of 1500 to 6500 pounds.

Each time an addition or subtraction of cast iron blocks to the top of the grinding wheel was made, the dynamic balance and contour-following capability of the wheel was materially changed, thereby varying the effective life of certain portions of the fixed abrasive grinding surface with respect to other portions, materially shortening the maximum working life of the grinding head, and producing variations in glass surface quality. As can be readily appreciated, since the cost of such a fixed abrasive grinding head is substantial, any factors substantially reducing the maximum possible life of such a grinding head or reducing the glass surface quality obtainable therewith are highly significant.

In accordance with the invention, there is provided apparatus for surfacing a planar work surface, such as a flat sheet of glass and the like, comprising a rotary grinding head, an elongated drive spindle, and constant velocity universal joint means for coupling the grinding head and the drive spindle in a substantially fixed driving relation, but at the same time facilitating free pivotal motion of the grinding head axis about the longitudinal axis of the drive spindle to effectuate a uniform grinding relation between the surface of the sheet of glass and all portions of the grinding surface contiguous therewith. In addition, selectively operated pressure control means are provided for controlling the longitudinal position of the drive spindle and the grinding head to establish a predetermined grinding relation between the grinding surface and the planar work surface. The mass of the grinding head is selected to be of a value intermediate the end points of the load range required for the particular grinding station, and is dynamically balanced when installed at that station. The effective load of the grinding head relative to the work surface is then varied throughout the required range by the selectively operated pressure control means which tends to selectively move the spindle and grinding head against or away from the surface of the sheet of glass to either increase or reduce the effective mass or load of the grinding head and thereby control the pressure exerted by the grinding head on the surface of the sheet of glass.

For a more complete understanding of the invention, reference may be had to the following detailed description taken in combination with the accompanying figures of the drawing in which.

Figure 1:
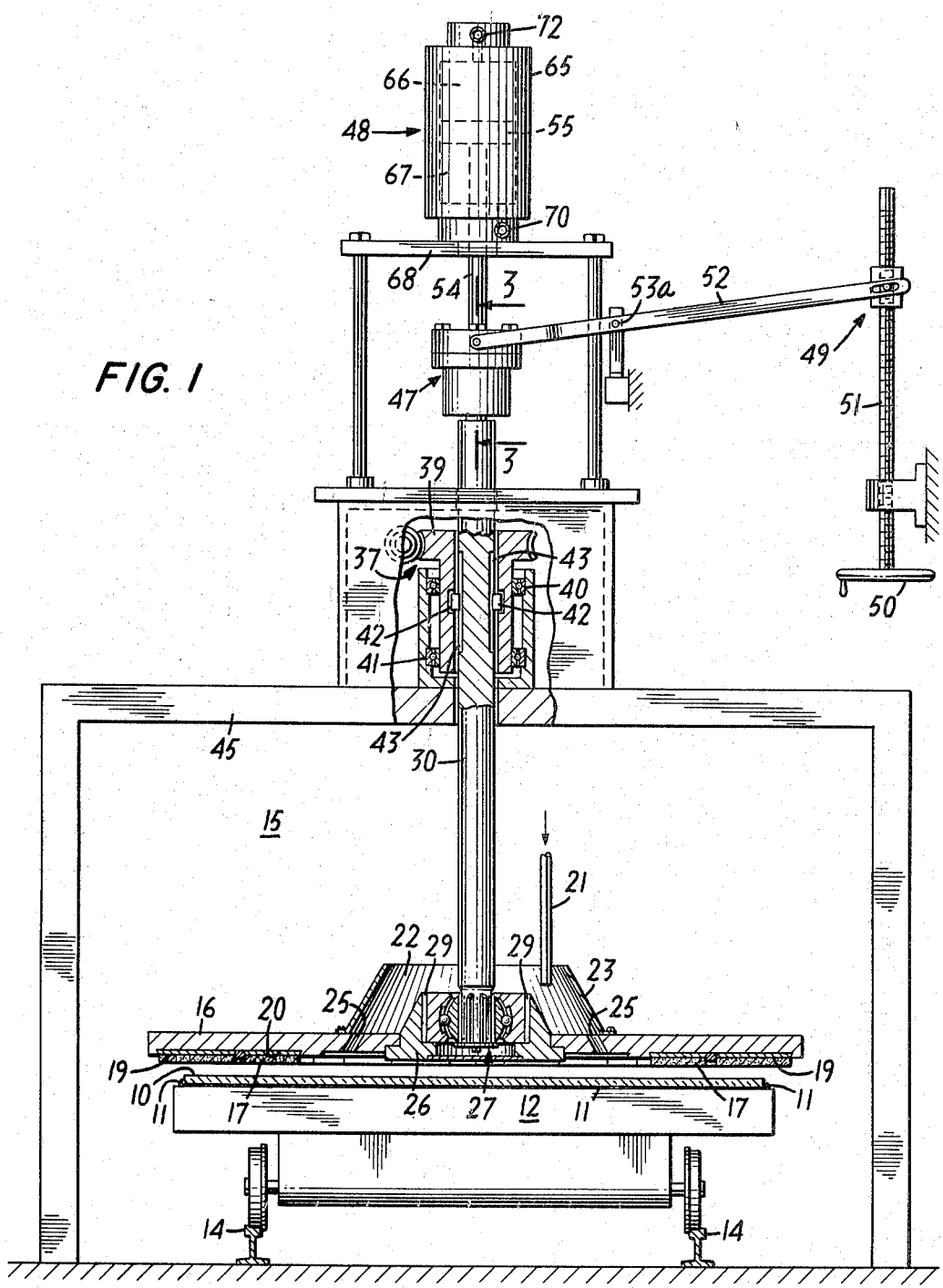
FIGURE 1 is an elevational view in partial cross-section of surfacing apparatus, in accordance with the invention.

In FIG. 1, a flat sheet of glass 10 is embedded in a bed 11 of plaster of Paris on the flat top surface of a flat car 12 which is adapted to run along the rails 14 through the various grinding and polishing stations of the surfacing line.

One of the grinding stations 15 includes a rotary grinding head consisting of a flat, rigid, circular plate 16 formed of steel or aluminum or other similar material with a plurality of concentric annular grinding segments 17 and 19 mounted on the lower face thereof in a fixed planar relation adapted to lie contiguous with and in grinding relation to the sheet of glass 10. The concentric annular grinding segments 17 and 19 are suitably keyed into channels 20 formed in the lower face of the plate 16. The annular grinding segments 17 and 19 are preferably composed of abrasive particles, such as diamond particles, fixedly bonded in a suitable metal or other well-known bond.

Coolant of any suitable conventional form is passed from a source of supply (not shown) through a conduit 21 emptying into a centrally located annular space 22 formed on the top surface of the plate 16 by a shield 23. The coolant flows from the space 22 under the influence of centrifugal force through a plurality of outwardly directed ducts 25 formed in the plate 16 to the space between the plate 16 of the grinding head and the sheet of glass 10, and then by intromissive flow between the grinding surfaces of the annular grinding segments 17 and 19 and the top surface of the sheet of glass 10, and through any suitable channels or grooves (not shown) in the faces of the annular grinding segments 17 and 19 to cool the grinding elements and work surface and remove glass and abrasive particles from the surfaces in grinding relation.

Figure 2:
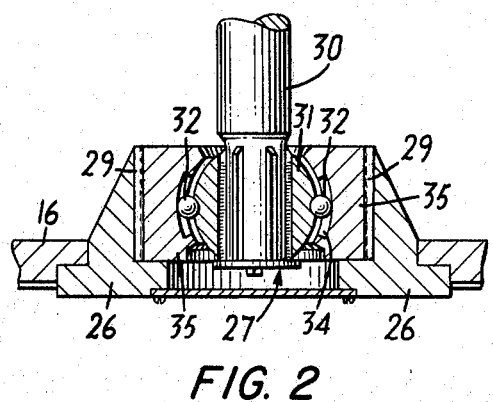
FIG. 2 is an enlarged cross-sectional view of the assembly embodiment of the coupling between the spindle and grinding head as shown in FIG. 1, in accordance with the invention.

An enlarged annular hub 26 is centrally located in the plate 16 in fixed engagement therewith. A constant velocity universal joint means 27 (shown in greater detail in FIG. 2) is fixedly mounted in the hub 26 by splines 29 or other suitable means. The constant velocity universal joint couples the plate 16 of the grinding head to a drive spindle 30 in a substantially fixed driving relation to provide a positive constant velocity drive of the grinding head without movement of the grinding head axially along the longitudinal axis of the spindle 30, but facilitating free pivotal motion of the grinding head about the longitudinal axis of the spindle 30 to effectuate a uniform grinding relation between the surface of the sheet of glass 10 and all portions of the grinding surfaces of the annular grinding segments 17 and 19 contiguous therewith. The constant velocity universal joint 27, which may take any suitable conventional form (such as for example the "Con-Vel" constant velocity universal joint, manufactured by Dana Corporation of Detroit, Michigan), includes a spherical element 31 fixedly connected by splines to the spindle 30 and having bearings 32 freely mounted in pockets in the element 31 and adapted to engage arcuate slots 34 in an outer element 35 closely enveloping a major portion of the outer surface of the spherical element 31, so as to only permit free pivotal motion of the plate 16 about the longitudinal axis of the spindle. The constant velocity universal joint 27 is adapted to withstand substantial thrust and forces exerted endwise by the spindle 30, so that longitudinal movement of the spindle 30 will positively control the position of the annular grinding segments 17 and 19 of the grinding head toward or away from the sheet of glass 10, thereby either increasing or decreasing the effective load of the grinding head upon the surface of the glass sheet 10.

The spindle 30 is driven by a power-operated drive means 37, such as a conventional worm gear drive or pulley drive positively rotating a sleeve 39 with respect to a fixed outer sleeve 40 spaced therefrom by suitable conventional bearing means 41. The sleeve 39 is keyed in a slidable keyway by one or more keys 42 mounted in pockets on the inner surface of the sleeve 39 and in longitudinally extending keyways 43 in the surface of the spindle 30, so as to provide in a conventional manner positive rotation of the spindle 30, but permitting longitudinal movement of the spindle 30 relative to the power-operated drive means 37.

The power-operated drive means 37 is mounted on top of a frame 45 straddling the surfacing line.

The spindle 30 continues upwardly from the power-operated drive means 37 to a yoke assembly 47 by which it is coupled to a selectively operated pressure control means 48 and to a conventional lever and screw mechanism 49. The lever and screw mechanism is used to lift the grinding head completely away from the surface of the sheet of glass 10 when it is desired to take the grinding station out of operation for maintenance or other purposes, and to place the grinding head down on the work surface of the sheet of glass 10, when the grinding station is intended to be in operation. The selectively operated pressure control means 48 is intended to positively control the longitudinal position of the drive spindle 30 and the grinding head including the plate 16 and annular grinding segments 17 and 19 to establish a predetermined load relation between the grinding head and the surface of the sheet of glass, during grinding operation.

The lever and screw mechanism 49 consists of a hand wheel 50 for rotating a lead screw 51 to control the position of a conventional lever arm 52 about a fixed pivot 53a, the opposite end of the lever arm 52 being connected in a forked arrangement to an adaptor 53 of the yoke assembly 47.

Figure 3:
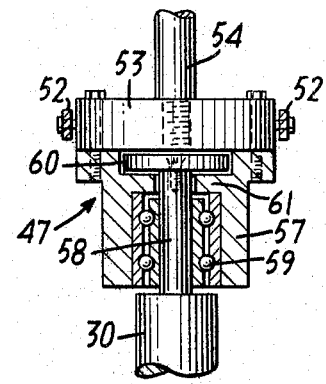
FIG. 3 is a partial sectional view of the shaft and yoke of FIG. 1 taken along the lines 3—3 and looking in the direction of the arrows.

In FIG. 3, the adaptor 53 is fixedly connected to an extension 54 of a stem of a piston 55 in the selectively operated pressure control means 48. Bolted to the adaptor 53 is an outer sleeve member 57, which is mounted about an end 58 of the spindle 30, and spaced therefrom by suitable bearing means 59 to permit relative rotation of the spindle end 58. A plate member 60 is fixedly connected to the spindle end 58 in such manner as to overlie a shoulder 61 on the outer sleeve member 57 of the yoke assembly 47 to provide positive coupling for longitudinal movement of the piston stem 54 with the spindle 30.

The selectively operated pressure control means 48 comprises an air cylinder 65 with the double acting piston 55 separating the interior into two air chambers 66 and 67, respectively positioned above and below the piston 55. The piston stem 54 extends from the yoke assembly 47 to the piston 55, and passes through the casing of the air cylinder 65 and a frame 68, which supports the air cylinder 65 fixedly in position above the power-operated drive means 37 and the yoke assembly 47.

Figure 4:
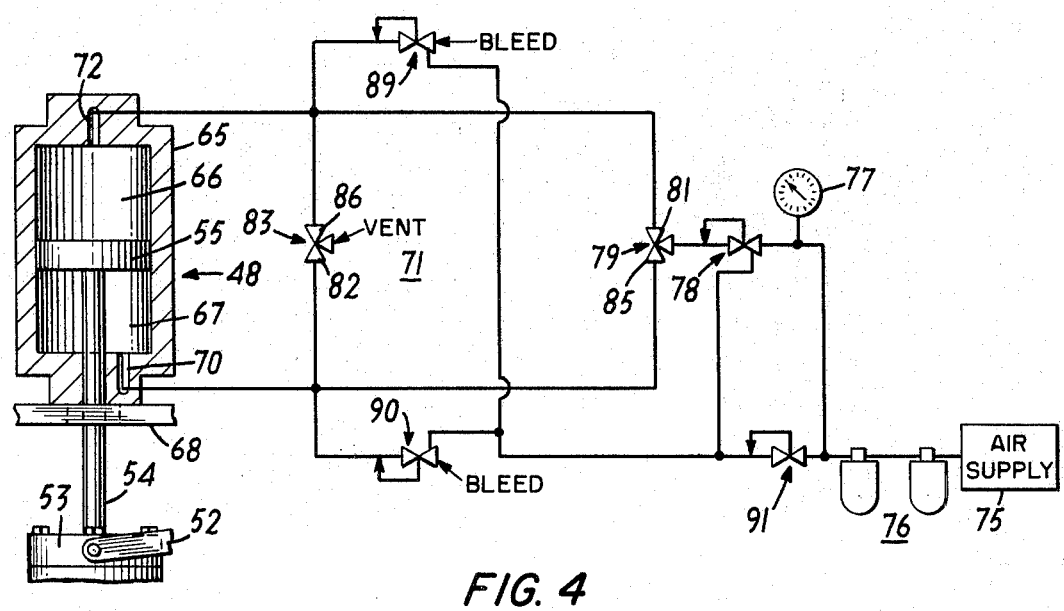
FIG. 4 is a schematic diagram of a control system for the selectively operated pressure control means of FIG. 1.

The lower chamber 67 of the selectively operated pressure control means 48 is connected by suitable duct means 70 to a valve control and regulating means 71 (FIG. 4), which selectively supplies air, or other suitable pneumatic or hydraulic fluid, to the chamber 67 to tend to move the piston 55 and in turn the spindle 30 and grinding head including the plate 16 and annular grinding segments 17 and 19 upwardly to reduce the effective mass or load of the grinding head upon the sheet of glass 10; or to vent the lower chamber 67 when the load of the grinding head is to be increased.

The upper chamber 66 is connected by suitable duct means 72 to the valve control and regulating means 71, so that fluid under pressure may be introduced therein to force the piston 55 downwardly to increase the load of the grinding head on the sheet of glass 10; or to vent the chamber 66 when the load is to be reduced.

The valve control and venting means 71, which may take any suitable form, illustratively comprises a compressed air supply 75, the output of which is connected through conventional air filter and trap means 76 past a suitable pressure gauge 77, through a gas ballast regulator 78 to the input of a three-way valve means 79, which may be either directly manually controlled or controlled in a suitable manner from a remote location. When it is desired to cause fluid under pressure to be admitted to the upper chamber 66 to force the piston and thus the spindle 30 and plate 16 downwardly toward the sheet of glass 10, a valve output 81 is opened on the three-way valve means 79, and a valve input 82 on another three-way valve means 83 is opened to vent the lower chamber 67 through the duct means 70.

When it is desired to urge the piston 55 upwardly to reduce the load on the surface of the sheet of glass 10, the output means 85 on the three-way valve means 79 is opened and the input means 86 on the three-way valve means 83 is opened so that air from the air supply 75 is passed through the duct means 70 to the lower chamber 67, and the upper chamber 66 is vented through the duct means 72 and the three-way valve means 83.

The amount of fluid pressure introduced to either the chamber 66 or the chamber 67 is controlled by suitable adjustment of the gas ballast regulator 78. The chambers 67 and 66 are at all times connected through their respective duct means 70 and 72 to respective gas ballast regulators 89 and 90, which are set for a maximum pressure and serve to bleed when pressure increases above such maximum pressure to prevent over-loading of the selectively operated pressure control means 48. The gas ballast regulators 78, 89 and 90 may be of any suitable conventional form, and are each connected through a gas regulator 91, which also may take any suitable conventional form, for example, a Hoke Model 660 Regulator, to the air supply 75, in order to obtain proper gas ballast.

The grinding station 15 is put into operation in the following manner. The hand-crank 50 on the lever and screw mechanism 49 is manually rotated to lower the spindle 30 and the fixedly coupled plate 16 of the grinding head to place the grinding surfaces of the annular grinding segments 17 and 19 in grinding relation to the sheet of glass 10. Coolant is supplied through the conduit 21 to flow by centrifugal force radially outward across the face of the sheet of glass 10 and intromissively across the grinding surface of the annular grinding segments 17 and 19. The power-operated drive means 37 rotates the spindle 30 and the plate 16 of the grinding head at a constant predetermined velocity by virtue of the fixed driving relation provided by the constant velocity universal joint 27, which permits free pivotal motion of the grinding head about the longitudinal axis of the spindle to effectuate a uniform grinding relation between the surface of the sheet of glass and all portions of the grinding surface contiguous therewith. The grinding head, including the plate 16, is dynamically balanced in any suitable conventional manner. The load of the grinding head upon the sheet of glass 10 is then set to a predetermined selected value by either increasing or decreasing the effective mass of the grinding head by selectively operating the pressure control means 48 to force the spindle 30 and the grinding head toward or away from the glass surface. In practice, it is possible to control with a fine degree of adjustment the effective load of the grinding head within a desired range, for example 2,000 or 3,000 pounds above and below the actual mass of the grinding head. This control can be effected without changing in any way the dynamic balancing and contour-following characteristics of the grinding head, so as to thereby materially extend the effective life of the grinding head, in particular grinding heads employing abrasive particles fixedly bonded therein.

Thus there is provided, in accordance with the invention, novel and improved apparatus for positively controlling the grinding characteristics of a rotary grinding head to substantially improve the surfacing work accomplished by the grinding head and materially extending the useful life of that head.

It will be understood by those skilled in the art that the above-described exemplary embodiments are susceptible of modification and variation without departing from the spirit and scope of the invention. For example, while various forms of universal joints, air cylinders and power drive arrangements have been disclosed, they are merely exemplary elements of the applicants' specific novel and unobvious combination. Therefore, it is deemed that the invention is not limited, except as defined in the appended claims.

We claim:

1. Apparatus for surfacing a flat sheet of glass and the like, comprising a rotary grinding head having an annular grinding surface with fixed abrasive bonded therein adapted to lie contiguous and in grinding relation to a surface of the glass sheet, the effective mass of said head determining the grinding relation between said grinding surface and the surface of the glass sheet, an elongated drive spindle susceptible of longitudinal movement for supporting and driving said rotary grinding head, power operated means slidably coupled to said drive spindle for driving said spindle at a constant predetermined spindle speed, constant velocity universal joint means for coupling said grinding head and said drive spindle in substantially fixed driving relation but facilitating free pivotal motion of said grinding head about the longitudinal axis of said spindle to effectuate a uniform grinding relation between the surface of the sheet of glass and all portions of said grinding surface contiguous therewith, and selectively operated pressure controlled means for controlling axial forces exerted on said drive spindle and said grinding head to establish a predetermined grinding relation between said grinding surface and the surface of the sheet of glass.

2. Apparatus as claimed in claim 1, wherein said selectively operated pressure controlled means comprises fluid pressure operated piston means coupled to said elongated drive spindle, and means for selectively controlling the fluid pressure to which said piston means is exposed.

3. Apparatus as claimed in claim 1, wherein said selectively operated pressure control means comprises a cylinder, a double acting piston having opposite pressure responsive faces slidably mounted in said cylinder and coupled to said elongated spindle, means for introducing fluid into said cylinder to exert a pressure on one face of said piston to tend to move said spindle and said grinding head against the surface of the sheet of glass to exert a first predetermined pressure thereon, and means for introducing fluid to the opposite face of said piston to tend to move said spindle and said grinding head away from the surface of the sheet of glass to reduce the pressure exerted thereon by said grinding head.

4. Apparatus for surfacing a flat sheet of glass and the like, comprising a dynamically balanced rotary grinding head of predetermined mass having an annular grinding surface with abrasive particles fixedly bonded therein adapted to lie contiguous and in grinding relation to a surface of the glass sheet, the effective mass of said head determining the grinding relation between said grinding surface and the surface of the glass sheet, an elongated drive spindle susceptible of longitudinal movement for supporting and driving said rotary grinding head, power-operated means slidably coupled to said drive spindle for driving said spindle at a predetermined spindle speed, constant velocity universal joint means for coupling said grinding head and said drive spindle in substantially fixed driving relation but facilitating free pivotal motion of said grinding head about the longitudinal axis of said spindle to effectuate a uniform grinding relation between the surface of the sheet of glass and all portions of said grinding surface contiguous therewith, said dynamically balanced rotary grinding head having a predetermined load relation to the surface of the sheet of glass dependent upon said mass, and selectively operated pressure control means for controlling axial forces exerted on said drive spindle and said grinding head to vary said predetermined load relation of said grinding head to the surface of the sheet of glass.

References Cited by the Examiner

UNITED STATES PATENTS

| 1,803,752 | 5/1931 | Ford | 51—110 X |
|---|---|---|---|
| 2,841,968 | 7/1958 | Helmke | 64—7 X |
| 2,854,829 | 10/1958 | Porter | 64—7 |
| 2,906,066 | 9/1959 | Laverdisse | 51—112 X |
| 3,019,564 | 2/1962 | Haracz | 51—134.5 X |
| 3,089,287 | 5/1963 | Dilks | 51—165.03 X |
| 3,166,919 | 1/1965 | Kayser | 64—21 |
| 3,177,628 | 4/1965 | Highberg | 51—283 |
| 3,200,541 | 8/1965 | Banti | 51—112 |

FOREIGN PATENTS 582,993   9/1959   Canada.

LESTER M. SWINGLE, *Primary Examiner.*